Jan. 25, 1966     R. F. SHANNON     3,230,995
STRUCTURAL PANEL AND METHOD FOR PRODUCING SAME
Filed Dec. 29, 1960
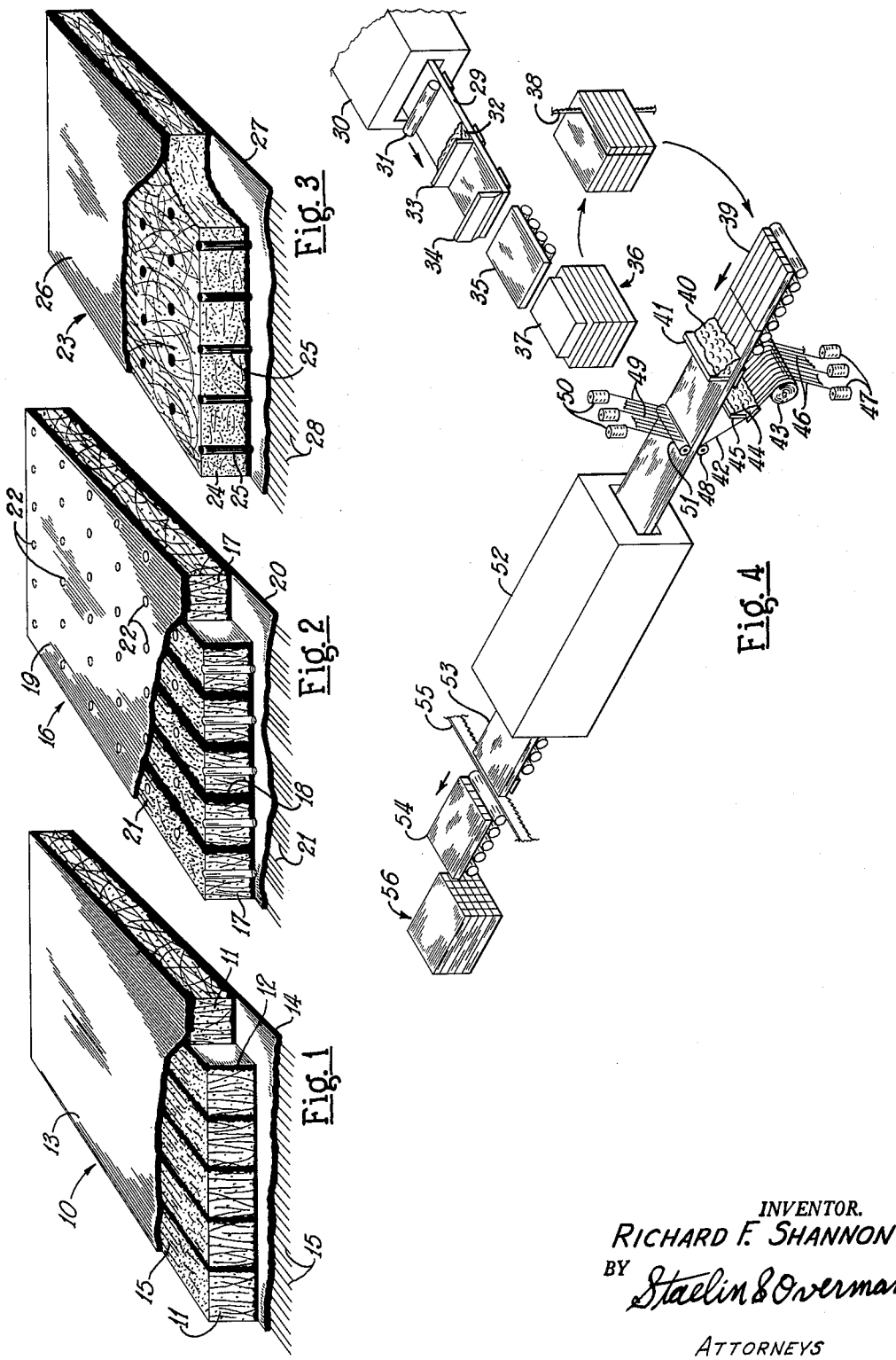
INVENTOR.
RICHARD F. SHANNON
BY Staelin & Overman
ATTORNEYS United States Patent Office 3,230,995
Patented Jan. 25, 1966

3,230,995
STRUCTURAL PANEL AND METHOD FOR
PRODUCING SAME
Richard F. Shannon, Lancaster, Ohio, assignor to Owens-Corning Fiberglas Corporation, a corporation of Delaware
Filed Dec. 29, 1960, Ser. No. 79,201
4 Claims. (Cl. 156—166)

This invention relates to an improved structural panel for a slab type roof deck or the like, and more particularly to an improved method for producing a lightweight insulating panel using on-end glass fiber boards bonded together with organic resins or inorganic cements.

Panels of this type have been produced by slicing preformed glass fiber boards into strips and individually coating the surfaces of the strips with inorganic cements. After coating, the strips are individually rotated through an angle of 90° to place the fibers on-end, and then the rotated strips are bonded together to form a slab.

The excessive number of steps involved made this process undesirable. Also, these panels are heavy because the relatively thick layers of non-reinforced cements between the strips are likewise relatively heavy, and many times the panels are not sufficiently strong to span required distances.

Further the panels of the prior art were not resistant to high temperatures and were unsuitable for fireproof installations. Also, some of the prior art panels had poor insulating characteristics.

The manufacturing problems of the prior art have been solved by the method of the present invention which includes the steps of coating the fibrous glass preformed boards or other core materials with a cement as they are formed, stacking these boards and slicing the stack at right angles to the cement. Thus only large sections of core material are handled.

The method of the present invention also represents an improvement over prior processes for producing structural I-beam insulation in the method of combining the cement with the glass fibers and the amounts of cement used. More particularly, instead of separating the strips in the core with thick layers of cement, the process of the present invention applies excess cement which is forced below the surfaces of the strips to provide a high strength region of combined cement and glass fiber core material adjacent each surface. Thus substantially all of the cement present is combined and reinforced with glass fibers, and maximum strengths are achieved with a minimum quantity of cement.

Prior art panels were also reinforced at their surfaces with a variety of materials. However, the increase in weight of the panels which was attributed to this reinforcing material was excessive in relationship to the increase in strength realized by the use of these materials.

It is, therefore, an object of the invention to provide a stronger structural panel which is produced at a lower cost.

A further object of the invention is to provide an improved structural panel having a high strength region of combined cement and glass fiber core material adjacent each surface and giving a maximum strength with a minimum of cement.

A still further object of the invention is to provide an improved method for producing structural panels which involves the handling of only large core sections.

A still further object of the invention is to provide a structural panel having improved weathering, insulating and fire resistant characteristics, and which retains its strength under wet conditions.

Further objects and advantages of the invention will be apparent from the following specification and drawings in which like numbers are used throughout to identify like parts.

FIG. 1 is a perspective view, partially broken away, showing the preferred form of a structural panel made in accordance with the invention, which form is referred to as an I-beam construction;

FIG. 2 is a perspective view, partially broken away, showing an alternate embodiment of a structural product made in accordance with the invention, which embodiment hereinafter will be referred to as an acoustical I-beam construction;

FIG. 3 is a perspective view, partially broken away, showing still another embodiment of a structural panel which hereinafter will be referred to as a column type construction; and FIG. 4 is a schematic view of the apparatus used in carrying out the method of the invention.

Referring now to FIG. 1, there is shown a structural panel 10 of the type that is herein referred to as an I-beam construction. The panel 10 comprises a plurality of porous core strips 11 that are in contact with one another and are held together with a hardened bonding material that is combined and reinforced with the material of the core strips to form areas of reinforcement or I-beams 12. The resulting core is capped by a top supporting skin 13 and a bottom supporting skin 14 each of which includes cement that is forced into the adjacent portions of the fibrous core to provide high strength regions of combined bonding material and fibers. A prime requisite of the strips 11 is that the surfaces which extend between the skins 13 and 14 not only be smooth but also be parallel to insure uniform contact between the surfaces of adjacent strips.

The porous core strips 11 may be made from preformed glass fiber boards in a manner which will be described later in detail. The strips 11 can be made from rockwool or glass fibers which do not slump below 1850° F., in which case the panels 10 will withstand elevated temperatures without collapsing as well as be light in weight, and are then suitable for use in fireproof installations. The rockwool or glass fibers are preferably bonded with an inorganic binder to form dimensionally stable fiber boards.

The strips 11 may also be made from indurated calcium silicates where it is desired that the cores of the panels be incombustible. Such a material is "Kaylo," a product of Owens-Corning Fiberglas Corporation. Low density is achieved in this material by using a large percentage of vermiculite, pearlite or other lightweight inorganic filler, or by frothing or foaming hydrous calcium silicate to a light density. Glass foam may also be used where the panel 10 is to be fireproof.

The strips 11 are light in weight, having an apparent density which is preferably from 9 to 12 pounds per cubic foot, particularly when the panel 10 is to span long distances without support. Very good results are obtained when the strips 11 have a density of 11 pounds per cubic foot, and satisfactory panels have been produced from fibrous glass strips having a density as low as 4½ pounds per cubic foot.

In order to attain a high compressive strength in the panel 10, the strips 11 are so arranged that the fibers are on-end; i.e. a majority of the fibers which make up the strips 11 are generally normal to the skins 13 and 14. The contacting surfaces of the strips 11 are flat and parallel, and the thickness of each individual strip between these parallel surfaces is preferably in the range from ⅞ inch to 1 inch.

As shown in FIG. 1, the combined cement and glass fibers at the contacting surfaces of the strips 11 forms I-beams 12 which gives the panel construction its name. It will be appreciated that, when thinner core strips 11 are used, correspondingly more I-beams 12 per linear foot are present in the panel 10. The cement is forced below the surface of each of the strips 11 in the fibrous core to provide high strength regions of combined cement and glass fibers adjacent each surface where stress and buckling is likely to occur. This produces a maximum strength with a minimum quantity of cement.

The bonding material in the I-beams 12 may be an organic resin or an inorganic cement. More particularly, this bonding material may be a formable novolac resin, a polyurethene foam, a polyester foam, or another similar foam or resin.

Also, inorganic cements have been satisfactory for use as the bonding material in the I-beams 12. For example, neutral, high strength alpha gypsums produce a very strong panel 10. A neutral gypsum [1] preferably has a compressive strength of at least 3500 p.s.i., a hardness of at least 80, and a maximum setting expansion of .003 inch per inch of product.

When strips 11 of "Kaylo" are used in the core of the panel 10, the surfaces of the strips must be treated. Otherwise, the affinity of such strips for water would result in water being removed from the gypsum before this cement has had sufficient time to set. Were this to happen, the hydration of the gypsum would not proceed in the normal manner, and the cement would not attain full strength.

This problem is solved by applying a substantially impervious, gypsum-compatable layer to the strips 11 before the gypsum is applied. Satisfactory results have been achieved by applying a 7 percent starch solution to the "Kaylo" to enable the gypsum to cure in the normal manner. Another material which is suitable for this layer is carboxy methyl cellulose with a viscosity of about 15 centipoises. Also, a water solution of bone glue is suitable for this layer. All of the above named materials are applied to the strips 11 as colloidal suspensions.

Calcined gypsum, which is obtained by heating raw gypsum to drive off most of the water of crystallization and form a gypsum hemihydrate, $CaSO_4.½H_2O$, is a satisfactory cement. This gypsum hemihydrate can combine readily with water, and the mechanism of setting is such that 18.6 pounds of water are required to convert 100 pounds of gypsum hemihydrate to the insoluble dihydrate, $CaSO_4.2H_2O$.

An important factor in mixing the gypsum slurry for the I-beams 12 is the use of "normal consistency" ratios. "Normal consistency" is defined as the number of parts of water, by weight, at a definite temperature, that is required to produce the slurry fluidity when mixed with 100 parts of calcined gypsum, by weight, in a specified manner. It is possible to vary the compressive strength of alpha gypsum from 1000 p.s.i. to 11,000 p.s.i. by changing only the "normal consistency"; the more water used in mixing, the weaker the set mass. Density, hardness, strength, resistance to abrasion, and water absorption are all intimately related to the quantity of water used in the mix.

[1] The term "neutral gypsum" is used herein in its recognized sense to refer to gypsum which is not highly alkaline, i.e. has a pH from about 7 to about 10.

Exceptionally good results have been obtained when the cement for the I-beams 12 was made from a gypsum slurry produced from "Industrial White Hydrocal," a product of the United States Gypsum Company having a "normal consistency" between 38 to 42. This gypsum is not only a neutral gypsum, but also sets to a high strength dihydrate. "Hydro-Stone," another high strength gypsum of The United States Gypsum Company and which is stronger than the "Industrial White Hydrocal," has been used to produce very strong panels when made in a slurry having a "normal consistency" prepared by mixing 100 parts by weight of "Hydro-Stone" with 34 parts by weight of water. However, the "Hydro-Stone" gypsum has a rather high pH value, and this alkalinity makes the use of "Hydro-Stone" cement under moist conditions undesirable because of possible fiber degradation.

Still another cement which exhibits excellent wet strength is a water resistant, modified plaster that has been treated with alum during calcination. The slurry for this cement has a "normal consistency" that is produced by adding 40 to 52 parts by weight of water to 100 parts by weight of cement, and this cement is especially useful where the panels are to be used in bath and shower room installations.

The second inorganic cement which is satisfactory for the I-beams 12 is magnesium oxysulphate which also has a neutral pH value. This cement is heat settable and not only sets much faster than gypsum, which is not heat reactive, but also lends itself to high speed curing processes. For example, thin films of magnesium oxysulphate cement can be cured in one minute at a temperature as low as 170° F. Alumnite and magnesium oxychloride cements are likewise neutral and are satisfactory for the cement in the I-beams 12.

Very good results have been obtained by using a cement slurry composed of 100 parts by weight of calcined magnesium oxide, 200 parts by weight of a 30 weight percent solution of $MgSO_4.7H_2O$, 200 parts by weight of potters flint, and 300 parts by weight of 80 mesh sand. This composition produced an extremely hard cement which showed no tendency to crack or craze upon drying, and in order to obtain a maximum wet strength the ratio of the calcined magnesium oxide to $MgSO_4.7H_2O$ was held to a 10:1 molar ratio (1.66:1 on a weight basis).

For fireproof panels having a heat resistant rockwool or glass fiber core, a hydraulic cement is used which, upon firing, converts to a ceramic cement. Sillimanite and alumnite cements are examples of such a material.

The same materials used in the I-beams 12 are likewise used in the top supporting skin 13 and the bottom supporting skin 14. While it is preferable that the skins 13 and 14 be kept as thin as possible with the cement being forced into the surfaces of the core to form a high strength region of combined cement and glass fibers, the resins and cements may be formed for installations where lower thermal conductivity is desired and over-all panel thickness is not critical. While foaming increases the thickness of the skins 13 and 14, the over-all weight of the panel 10 is not increased.

The skins 13 and 14 are given additional reinforcement by equally spaced glass rovings 15 embedded therein. The rovings 15 prevent cracking and crazing of the skins which can occur because of shrinkage of the cement during drying. These rovings are preferably 150 strand, 20-end and are laid parallel in the direction of the I-beams 12 to insure maximum utilization of fiber strength. Very good results have been obtained when 15 to 20 grams of the rovings 15 per square foot of panel surface are used, with 15 grams being preferable. However, the quantity of rovings used may vary between 5 to 30 grams per square foot, depending upon the amount of reinforcement required. In the fireproof panels, rovings 15 comprise high temperature glass fibers or glass fibers that have been leached and treated with a solution of a chromium salt such as chromium sulfate followed by a dip in $NH_4OH$.

Upon firing the chromium hydroxide formed was converted to $Cr_2O_3$.

A typical panel 10 of the type shown in FIG. 1 constructed in accordance with the invention has a plurality of core strips 11 that are ⅞ inch thick and 2 inches wide. In the typical panel 10 these strips 11 contact each other and are bonded together with an inorganic cement, such as the neutral gypsum or magnesium oxysulphate, to form I-beams 12 on ⅞ inch centers. The resulting glass-cement composite core has an apparent density of 16 to 18 pounds per cubic foot, and the core composition is 57⅔ percent by weight of glass wool and 43½ percent by weight of cement. This typical panel 10 has 1/16 inch thick supporting skins 13 and 14 composed of 15 grams of rovings 15 and 200 to 250 grams of cement per square foot of skin. The 2 inch core plus the two 1/16 inch skins form a panel 10 having a thickness of 2⅛ inches and an apparent density of 22 to 24 pounds per cubic foot.

Roof structures are designed for long life, and the physical properties of the panels must be such that they can be safely used throughout this life. Flexural strength and flexural modulus are physical properties which indicate the reliability of a structural member, and these properties of sample panels constructed according to the invention, using both gypsum and magnesium oxysulphate cements, are given below in Table I.

TABLE I

| Cement material | Magnesium oxysulphate | | Gypsum | |
|---|---|---|---|---|
| Sample number | 1 | 2 | 3 | 4 |
| Panel thickness (in.) | 2.125 | 2.1875 | 2.125 | 2.15 |
| Apparent density (lbs./ft.³) | 20.2 | 20.0 | 22.7 | 24.4 |
| Flexural strength (p.s.i.): | | | | |
| Maximum | 217 | 620 | 1,129 | 1,161 |
| Proportional elastic limit | 395 | 400 | 402 | 367 |
| Flexural modulus (×10³ p.s.i.) | 171 | 170 | 516 | 632 |

The panel of sample number 2 had a layer of polyisobutylene on the surface exposed to the weather. The flexural strengths of the panels in the various samples above vary according to the following factors: the overall apparent density; the core construction, density and composition; and the thickness, composition and amount of reinforcement used in the skins. Some panels in the 24 to 25 pounds per cubic foot apparent density range have been made which had a flexural modulus as high as 730×10³ p.s.i.

The flexural strengths and flexural moduli shown in Table I are for the samples without any previous conditioning. Inasmuch as flexural strength is reduced in a moist environment, a freeze-thaw test was used to condition the panels by submitting them to three freeze-thaw cycles, each of which consisted of 24 hours in a humidity cabinet followed by 24 hours in a freezer, and then testing them for flexural strength and modulus. The results of these tests appear below in Table II.

TABLE II

| Sample number | 1 | 2 | 3 |
|---|---|---|---|
| Flexural strength (p.s.i.): | | | |
| Maximum | 829 | 830 | 997 |
| Proportional elastic limit | 220 | 220 | 295 |
| Flexural modulus (×10³ p.s.i.) | 190 | 190 | 333 |

Sample number 4 was given a more extensive two week conditioning in a weathering room. At the end of this period the maximum flexural strength was reduced by 11 percent while the flexural modulus was reduced 13 percent. None of the skins of the samples exhibited any tendency to separate from the core strips because of freezing or moisture condensation within the panels.

An increase rather than a decrease in flexural modulus occurred after three freeze-thaw cycles in samples 1 and 2. Both of these samples used magnesium oxysulphate, which is highly resistant to water when the molar ratio is 10:1 or higher as stated earlier, illustrating that such panels tend to maintain their stiffness under extremely adverse wet conditions. While each of the magnesium oxysulphate panels exhibited a flexural modulus which was lower than any of the gypsum panels, the lower densities of the magnesium oxysulphate panels by comparison with those of the gypsum panels may account for this difference in values.

Compressive strengths of additional panels, identified as samples 5 and 6, are listed below in Table III. Here again the panels were tested dry and in a conditioned state after they had been subjected to three cycles, each of which included 24 hours in a humidity cabinet followed by 24 hours in a freezer.

TABLE III

| Sample number | 5 | 6 |
|---|---|---|
| Bonding material | Gypsum | Magnesium oxysulphate |
| Density (lbs./ft.³) | 22.3 | 21.6 |
| Compressive strengths— | | |
| Dry: | | |
| Maximum load (p.s.i.) | 152.0 | 159.0 |
| Deflection (percent) | 3.6 | 3.1 |
| Proportional elastic limit: | | |
| Load (p.s.i.) | 113.0 | 136.0 |
| Deflection (percent) | 2.6 | 2.6 |
| Conditioned: | | |
| Maximum load (p.s.i.) | 124.0 | 142.0 |
| Deflection (percent) | 2.7 | 2.8 |
| Proportional elastic limit: | | |
| Load (p.s.i.) | 115.0 | 124.0 |
| Deflection (percent) | 2.4 | 2.4 |

An important measure of reliability of structural panels is their impact strength, which may be ascertained by dropping a 10-pound weighted bag onto a seven-inch wide panel that is 32 inches long and is mounted on spaced supports one inch wide to provide a 30-inch span. The bag is repeatedly dropped from heights increasing in six-inch increments until the panel breaks or the deflection is sufficient to cause the panel to fall from the spaced supports. The panel of sample No. 4 broke when the bag was dropped from a height of 84 inches, while another panel having an identical density of 24.2 pounds per cubic foot and a thickness of 2.1875 inches, including a layer of polyisobutylene on one surface, broke when the bag was dropped from a height of 108 inches.

These panels also had very low thermal conductivity. A 32-inch by 48-inch panel having I-beams formed of gypsum cement and a layer of polyisobutylene adhered to one face had an over-all thickness of 2.185 inches and a density of 23 pounds per cubic foot. The conductance value ($c$) of this panel was found to be 0.293 B.t.u. per hour per foot² per degree F., and the transmittance value ($u$) was determined to be 0.211 B.t.u. per hour per foot² per degree F.

Referring now to FIG. 2, there is shown a panel 16 having improved acoustical properties. More particularly, the panel 16 comprises a plurality of lightweight core strips 17 which contact one another and are bonded together at adjoining surfaces by layers of cement which form I-beams 18. As in the case of the panel shown in FIG. 1, the panel 16 has a top skin 19 and a bottom skin 20. The skins 19 and 20 are reinforced by spaced, parallel rovings 21.

The rovings 21 of the panel 16 are bunched directly over the I-beams 18, leaving a space ½ inch to ⅝ inch wide, and free of rovings, between the ribs. Holes 22 are drilled in these roving free spaces, preferably on one inch centers.

A comparison between a structural I-beam panel of the type shown in FIG. 1 and the acoustical panel shown in FIG. 2 are listed below in Table IV.

TABLE IV

|  | Structural panel | Acoustical panel |
|---|---|---|
| Density (lbs./ft.³) | 22.3 | 20.0 |
| Flexural Strength (p.s.i.)— | | |
| Dry: | | |
| Maximum | 1,129 | 1,139 |
| Proportional elastic limit | 403 | 368 |
| Conditioned: | | |
| Maximum | 997 | 1,049 |
| Proportional elastic limit | 295 | 218 |
| Flexural modulus (×10³ p.s.i.): | | |
| Dry | 516 | 474 |
| Conditioned | 333 | 281 |

Referring to FIG. 3, there is shown a panel 23 of the column type. The panel 23 comprises a core 24 of preformed glass fibers in the form of a board having a plurality of columns 25 therein. The core 24 may also be commercial acoustical base board. The opposite surfaces of the core 24 are covered with a top supporting skin 26 and a bottom supporting skin 27 reinforced by a plurality of equally spaced, parallel rovings 28. The columns 25 are preferably between 0.17 and 0.22 inch in diameter and spaced on one inch centers.

Other materials, such as chopped fibers or mat, may be used as a reinforcing medium for the skins 27 and 28. More particularly, five basic types of glass reinforcing media have been used with satisfactory results. These are 10 mill bonded mat, one ply of base mat, one ply of ½ ounce mechanical mat, two inch lengths of 150's cut strands, and 20-end parallel roving. In the case of the light density "Kaylo" panels faced with gypsum, the addition of 0.5 percent by weight of ½ inch long glass strands doubled the modulus of the panel with only a slight over-all apparent density change from 21 p.c.f. to 23 p.c.f.

A number of column type panels of the FIG. 3 type, made with "Industrial White Hydrocal" gypsum in both the columns and the skins, have been produced. The core of each panel was acoustical base board, and the columns of each panel were on one inch centers. Various properties of these panels are listed below in Table V.

TABLE V

| Sample number | 1 | 2 | 3 | 4 | 5 |
|---|---|---|---|---|---|
| Density (p.c.f.) | 16.2 | 15.5 | 16.0 | 16.0 | 16.0 |
| Composition: | | | | | |
| Cement (percent by weight) | 30.8 | 35.0 | 36.1 | 36.1 | 36.1 |
| Glass (percent by weight) | 69.2 | 65.0 | 63.9 | 63.9 | 63.9 |
| Skin reinforcement | Roving | Base mat | Bonded mat | Cut strands | Bonded mat |

The panels 23 are produced by drilling holes on one inch centers in a preformed glass fiber board and filling the holes with a cement slurry or foamable resin by troweling over the top surface of the board. The cement or foamable resin can be of the type previously described that is used in the panels 10 and 16 of FIGS. 1 and 2.

After the holes are filled with the cement slurry, additional slurry is forced into the top surface by further troweling. The reinforcing glass rovings 28 are then placed in position and a second layer of cement slurry is applied. After the top supporting skin 27 has taken a green set, the panel 23 is turned over and the bottom skin 27 is applied in an identical manner.

The method and apparatus for producing the panel 10 of FIG. 1, which is a preferred embodiment of the invention, is illustrated in FIG. 4. More particularly, a porous mass of core material such as a preformed glass fiber board 29, preferably having an apparent density of 9 to 12 p.c.f., is cured in an oven 30 in a conventional manner. As the board 29 leaves the oven 30 it may be supported by a conveyor and is sanded by any suitable device indicated at 31 to insure uniform thickness and parallel surfaces.

When the panels are to be used in fireproof installations, the porous mass of core material may be boards made from reacted calcium silicates, such as "Kaylo," and these boards are fed to the sanding device 31. After sanding of the top surface thereof, the "Kaylo" boards are knife coated with the previously described collodial suspension of starch, carboxyl methyl cellulose, or bone glue if gypsum cement is to be used in the panel, and this layer need not be dry before the gypsum is applied.

Cement which is used for I-beams as previously described and indicated at 32 is applied by an applicator 33 to a uniform thickness. The applicator 33 is shown in FIG. 4 in the form of a doctor blade that is suitable for coating the top surface of the board 29. However, spray nozzles (not shown) may be used to apply the foamable organic resins. Also, roller coaters may be used to apply both the organic resins and the inorganic cements.

A suitable chopping device 34 is utilized to cut the preformed board, with the cement applied to its upper surface, to predetermined lengths, and to form individual coated boards indicated at 35. The individual boards 35 are assembled in a stack 36 to arrange the boards in juxtaposition with a coated surface of one board in contact with the uncoated surface of the adjacent board, and while the stack may contain any number of boards, a stack of twelve boards one inch thick is convenient to handle. A heavy weight 37 is applied to the coated surface of the topmost board of the stack to apply a pressure thereto for forcing the cement into the surfaces of the boards and to maintain the boards in contact with one another.

After a green set is achieved in the cement between the individual boards, each stack is longitudinally cut at right angles to the layers of the cement by a conventional cutting device 38, such as a vertical band saw, to form the cement coated core sections illustrated in FIG. 1.

Here again, if the core material is "Kaylo," the surfaces of the core sections are knife coated with the starch solution, carboxy methyl cellulose or bone glue solution if gypsum is to be applied.

As these core sections are removed from the stack after being sawed, they are sequentially aligned to form a slab 39, and, as the slabs 39 are moved in a longitudinal direction, cement of the type previously described and indicated at 40 is applied to the top surface thereof by an applicator 41, which may be a doctor blade, spray nozzle or roller coater, to form the top supporting skins 13 of FIG. 1. If the panels are to be subjected to excessive stresses which might tend to separate the skins from the core strips, the slab 39 may be perforated on both its top and bottom surface, and the slab 39 is perforated before the cement 40 is applied. Each perforation is preferably ½ inch to ¾ inch deep, and approximately ³⁄₁₆ inch in diameter. The perforations are located midway between the I-beams and are placed on 1½ inch centers.

A backing 42, e.g. of polyisobutylene, is supplied from a roll 43 to the underside of the slab 39. Cement or resin of the type previously described and indicated at 44 is applied to the upper surface of the backing 42 by an applicator 45, which may be a doctor blade, spray nozzle or roller coater to form the bottom supporting skin 14 of FIG. 1.

After the cement 40 has been placed on the top surface of the slab 39 and as the cement 44 is deposited on the backing 42, spaced rovings are embedded in each of these layers of cement as illustrated by the parallel rovings 15 in FIG. 1. More particularly, as shown in FIG. 4, parallel rovings 46 having equal spacings therebetween are supplied from spools 47 and are fed into the cement 44. The rovings 46 are embedded in the cement 44 by both the applicator 45 and a roller 48 which forces a portion of the cement into the bottom surface of the slab 39. Likewise, spaced rovings 49 are fed from spools 50 into the cement 40 and a roller 51 embeds these rovings in the cement while forcing a portion of the cement into the upper surface of the slab 39.

The coated slab 39 is continuously fed into an oven 52 which foams the resin, if a foamable resin is used, or cures the cement if magnesium oxysulphate is used. The oven 52 may be eliminated if gypsum is used as the bonding material.

The finished board 53 leaves from the exit side of the oven 52 as shown in FIG. 4, and is cut into appropriate panels 54 by a suitable cutting device 55. The panels 54 are stacked at 56.

If acoustical panels of the embodiment shown in FIG. 2 are to be produced, the parallel rovings 46 and 49 are not equally spaced, but are grouped over the layers of cement in the slabs. Likewise, after the finished board leaves the oven 52 to be sawed into panels, these panels are subsequently drilled.

While various embodiments of the invention have been illustrated and described, it will be appreciated that other changes and modifications can be made from the specific details discussed herein without departing from the spirit and scope of the appended claims.

I claim:

1. The method of making a lightweight structural panel from board material having fibers bonded together at spaced apart points and wherein the fibers are generally parallel to opposite surfaces of the material, said method comprising the steps of coating one of said opposite surfaces of each of a plurality of sections of the board material with a hardenable bonding material, assembling the coated sections in juxtaposition with a coated surface of each section adjacent one of said surfaces of an adjacent section, applying a pressure to an endmost coated section to force the sections together and cause the bonding material to flow generally laterally into the juxtaposed sections from their adjacent surfaces, cutting the assembled sections of material at right angles to the coated surfaces to form a plurality of strips having oppositely disposed surfaces normal to the previously coated surfaces, coating said oppositely disposed surfaces with a hardenable bonding material, and causing the bonding material to harden after the bonding material has been forced laterally past fibers in adjacent regions of the strips to provide areas of reinforcement laterally stiffening the fibers in adjacent regions of the strips and to form reinforcing skins on the oppositely disposed surfaces of the strips.

2. The method of making a lightweight structural panel from board material having fibers bonded together at spaced apart points and wherein the fibers are generally parallel to opposite surfaces of the material, said method comprising the steps of coating one of said opposite surfaces of each of a plurality of sections of the board material with a hardenable bonding material, assembling the coated sections in juxtaposition with a coated surface of each section adjacent one of said surfaces of an adjacent section, applying a pressure to an endmost coated section to force the sections together and cause the bonding material to flow generally laterally into juxtaposed sections from their adjacent surfaces, cutting the assembled sections of material at right angles to the coated surfaces to form a plurality of strips having oppositely disposed surfaces normal to the previously coated surfaces, applying a layer of a hardenable bonding material to each of said oppositely disposed surfaces, embedding a reinforcing material in each of said layers of bonding material, forcing a portion of the bonding material into said oppositely disposed surfaces, causing the layers of reinforced bonding material to harden and form reinforcing skins on oppositely disposed surfaces, and causing the bonding material in adjacent regions of said strips to harden after being forced laterally past fibers in adjacent regions of said strips to form areas of reinforcement extending between said skins.

3. The method of making a lightweight structural panel from board material having fibers bonded together at spaced apart points and wherein fibers are generally parallel to opposite surfaces of the material, said method comprising the steps of coating one of said opposite surfaces of each of a plurality of sections of the board material with a hardenable bonding material, assembling the coated sections in juxtaposition with a coated surface of each strip adjacent one of said surfaces of an adjacent section, applying a pressure to an endmost coated section to force the sections together and cause the bonding material to flow generally laterally into juxtaposed sections from their adjacent surfaces, cutting the assembled sections of board material at right angles to the coated surfaces and crosswise to the generally parallel fibers to form a plurality of strips having oppositely disposed surfaces normal to the coated surfaces and in which fibers extend lengthwise between said oppositely disposed surfaces, coating said oppositely disposed surfaces with a hardenable bonding material, and causing the bonding material to harden after being forced laterally past fibers in adjacent regions of said strips to form areas of reinforcement in the adjacent regions of the strips and reinforcing skins on the oppositely disposed surfaces of the strips.

4. The method of making a lightweight structural panel from board material having fibers bonded together at spaced apart points and wherein fibers are generally parallel to opposite surfaces of the material, said method comprising the steps of coating one of said opposite surfaces of each of a plurality of sections of the board material with a hardenable bonding material, assembling the coated sections in juxtaposition with a coated surface of each strip adjacent one of said surfaces of an adjacent section, applying a pressure to an endmost coated section to force the sections together and cause the bonding material to flow generally laterally into juxtaposed sections from their adjacent surfaces, cutting the assembled sections of board material at right angles to the coated surfaces and crosswise to the generally parallel fibers to form a plurality of strips having oppositely disposed surfaces normal to the coated surfaces and in which fibers extend lengthwise between said oppositely disposed surfaces, applying a layer of a hardenable bonding material to each of said oppositely disposed surfaces, positioning fibrous reinforcing material above each of the coated surfaces with fibers extending in the direction of said coated surfaces, embedding the fibrous reinforcing material in said layers adjacent the coated surfaces, forcing a portion of the bonding material into said oppositely disposed surfaces, hardening the layers of reinforced bonding material to form reinforcing skins on oppositely disposed surfaces and causing the bonding material to harden after being forced laterally past fibers in adjacent regions of said strips to form areas of reinforcement in adjacent regions of the strips.

References Cited by the Examiner

UNITED STATES PATENTS

| | | | |
|---|---|---|---|
| 2,053,173 | 9/1936 | Astima. | |
| 2,373,500 | 4/1945 | Pierce | 156—260 |
| 2,475,789 | 7/1949 | Kunz | 156—260 |
| 2,546,230 | 3/1951 | Modigliani. | |
| 2,927,623 | 3/1960 | Huisman et al. | 154—93 |
| 2,990,027 | 6/1961 | Sabine | 161—113 |
| 2,999,040 | 9/1961 | Burdick | 154—43 |
| 3,061,492 | 10/1962 | Singleton et al. | 154—43 |

EARL M. BERGERT, *Primary Examiner.*

CARL F. KRAFFT, *Examiner.*